(12) United States Patent
Lvov et al.

(10) Patent No.: US 10,528,695 B1
(45) Date of Patent: Jan. 7, 2020

(54) INTEGER ARITHMETIC METHOD FOR WIRE LENGTH MINIMIZATION IN GLOBAL PLACEMENT WITH CONVOLUTION BASED DENSITY PENALTY COMPUTATION

(71) Applicant: International Business Machines Corporation, Armonk, NY (US)

(72) Inventors: Alexey Y. Lvov, Congers, NY (US); Gi-Joon Nam, Chappaqua, NY (US); Benjamin Neil Trombley, Hopewell Junction, NY (US); Myung-Chul Kim, Travis, TX (US); Paul G. Villarrubia, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/048,093

(22) Filed: Jul. 27, 2018

(51) Int. Cl.
*G06F 17/50* (2006.01)
*G06F 17/15* (2006.01)

(52) U.S. Cl.
CPC .......... *G06F 17/5072* (2013.01); *G06F 17/15* (2013.01); *G06F 17/5077* (2013.01)

(58) Field of Classification Search
CPC ... G06F 17/5072; G06F 17/15; G06F 17/5077
USPC ....................................................... 716/122
See application file for complete search history.

(56) References Cited

U.S. PATENT DOCUMENTS 6,301,693 B1   10/2001 Naylor
6,393,451 B2*   5/2002 Leyonhjelm ............. H04L 5/06
                                                    708/405
6,662,348 B1   12/2003 Naylor
7,676,782 B2*   3/2010 Samanta ............. G06F 17/5054
                                                    326/39
2007/0245280 A1* 10/2007 Van Eijk ............. G06F 17/5072
                                                    716/102

(Continued)

FOREIGN PATENT DOCUMENTS

CN   106021722 A   5/2016
CN   106980730 A   3/2017

OTHER PUBLICATIONS

Jiang et al, "Challenges and Solutions in Modern VLSI Placement", IEEE, 2007, All pages (Year: 2007).*

(Continued)

*Primary Examiner* — Suresh Memula
(74) *Attorney, Agent, or Firm* — Erik Johnson; Otterstedt, Wallace & Kammer, LLP

(57) ABSTRACT

A putative circuit design is represented as a set of movable blocks of predetermined size which must fit into a bounding box, with a plurality of subsets to be interconnected by wires. A total weighted wire length is determined as a function of coordinates of centers of the movable blocks by summing a half perimeter wire length over the plurality of subsets, and a density penalty is determined as a convolution of an indicator function of the current placement and a convolution kernel, via incremental integer computation without use of floating point arithmetic. Blocks are moved to minimize a penalty function which is the sum of the total weighted wire length and the product of a density penalty weight and the density penalty. The process repeats until a maximum value of the density penalty weight is reached or the density penalty approaches zero.

20 Claims, 15 Drawing Sheets

$$\text{density penalty } DP(v) \stackrel{\text{def}}{=} \sum_{\text{over all bins } B_j} \max\left(0, \left(\frac{\text{The excess of Convolution\_Of\_Surrounding\_Bins\_Areas}(B_j, v)}{\text{over the critical convolution value.}}\right)\right)^2$$

(56) References Cited

U.S. PATENT DOCUMENTS

2018/0307790 A1* 10/2018 Chuang ............... G06F 17/5077

OTHER PUBLICATIONS

Wang et al., "Closing the Gap between Global and Detailed Placement: Techniques for Improving Routability", ACM, Mar. 2015, All pages (Year: 2015).*
Prabhakar, R., et al. Optimization of Placement for Modern VLSI Design, International Conference on VLSI, Communication & Instrumentation (ICVCI) 2011 Proceedings published by International Journal of Computer Applications (IJCA), pp. 34-38.
Liu, Y., et al., (2014). Density-based penalty parameter optimization on C-SVM, Hindawi Publishing Corporation, The Scientific World Journal, vol. 2014, Article ID 851814, 9 pages 2014.
Cong, J., et al.,(2008). Highly efficient gradient computation for density-constrained analytical placement. IEEE Transactions on Computer-Aided Design of Integrated Circuits and Systems, 27(12), pp. 2133-2144.
Chen, T. C., et al., (2008). NTUplace3: An analytical placer for large-scale mixed-size designs with preplaced blocks and density constraints. IEEE Transactions on Computer-Aided Design of Integrated Circuits and Systems, 27(7), pp. 1228-1240. 2008.
Myung-Chul Kim, et al., MAPLE: Multilevel adaptive placement for mixed-size designs, Mar. 25-28, 2012, ISPD '12 Proceedings of the 2012 ACM international symposium on International Symposium on Physical Design, pp. 193-200.
Viswanathan, Natarajan, et al., FastPlace: efficient analytical placement using cell shifting, iterative local refinement, and a hybrid net model. IEEE Transactions on Computer-Aided Design of Integrated Circuits and Systems 24.5 (2005): pp. 722-733.
Luo, T., et al., (Jan. 2008). DPlace2. 0: A stable and efficient analytical placement based on diffusion. In Proceedings of the 2008 Asia and South Pacific Design Automation Conference (pp. 346-351). IEEE Computer Society Press.
Markov, Igor L., et al., Progress and challenges in VLSI placement research. Computer-Aided Design (ICCAD), 2012 IEEE/ACM International Conference on. IEEE, 2012, pp. 275-282.
Alpert, C., et al., (Nov. 2012). Placement: Hot or not?. In Computer-Aided Design (ICCAD), 2012 IEEE/ACM International Conference on (pp. 283-290).
Lu, J., et al., Jun. 2014. ePlace: Electrostatics based placement using Nesterov's method. In Proceedings of the 51st Annual Design Automation Conference (pp. 1-6). ACM.
Jung, J., et al., (Nov. 2016). OWARU: free space-aware timing-driven incremental placement. In Proceedings of the 35th International Conference on Computer-Aided Design (pp. 1-8).
Lin, T., Chu, et al., (Nov. 2015). POLAR 3.0: An ultrafast global placement engine. In Proceedings of the IEEE/ACM International Conference on Computer-Aided Design (pp. 520-527).
Wu, G., Lin, et al., (Nov. 2014). Asynchronous circuit placement by lagrangian relaxation. In Proceedings of the 2014 IEEE/ACM International Conference on Computer-Aided Design (pp. 641-646).
Kim, Myung-Chul, et al., SimPL: An effective placement algorithm. IEEE Transactions on Computer-Aided Design of Integrated Circuits and Systems 31, No. 1 (2012): pp. 649-656.

* cited by examiner

FIG. 4

$$\text{TWWL}(v) \stackrel{\text{def}}{=} \sum_{\text{over all nets } N_i} \text{HalfPerimeter}(N_i, v)$$

FIG. 5

$$\text{density penalty } \text{DP}(v) \stackrel{\text{def}}{=} \sum_{\text{over all bins } B_j} \max\left(0, \left(\begin{array}{c}\text{The excess of}\\ \text{Convolution\_Of\_Surrounding\_Bins\_Areas}(B_j, v)\\ \text{over}\\ \text{the critical convolution value.}\end{array}\right)\right)^2$$

| DESIGN NAME | NO ALV (12 THREADS) WL/CPU | | ALV (12 THREADS) WL/CPU | | HPWL IMPRV. |
|---|---|---|---|---|---|
| EXAMPLE DESIGN 1 | 2823323 | 28s | 2354499 | 439s | 16.60% |
| EXAMPLE DESIGN 2 | 7075908 | 41s | 6580867 | 1158s | 7.00% |
| EXAMPLE DESIGN 3 | 1940623 | 18s | 1796145 | 507s | 7.44% |
| EXAMPLE DESIGN 4 | 16337072 | 46s | 12810755 | 2118s | 21.58% |

INTEGER ARITHMETIC METHOD FOR WIRE LENGTH MINIMIZATION IN GLOBAL PLACEMENT WITH CONVOLUTION BASED DENSITY PENALTY COMPUTATION

BACKGROUND

The present invention relates to the design of integrated circuits (ICs), and more specifically, to placement analysis of such circuits.

In VLSI (very large scale integration) digital design, a netlist (from logic synthesis) includes a network of combinational logic gates and memory elements such as latches/flip-flops. During the placement phase, the netlist is presented as sea-of-standard cells (nodes) with connectivity matrix (edges) for placement during physical design. The placement stage determines the location of cells with the objective to optimize wire length while spreading cells to resolve overlaps and meet density constraints. Current large-scale placement approaches use floating point-based analytical/mathematical techniques to solve a closed form model of Half-Perimeter Wire length (HPWL) as an estimate for routed wire length.

Current floating point approaches are computationally intensive.

SUMMARY

Principles of the invention provide techniques for integer arithmetic wire length minimization in global placement with convolution based density penalty computation. In one aspect, an exemplary method, implemented at least in part on a computer, includes representing a putative circuit design as a set of movable blocks of predetermined size which must fit into a bounding box. The set of movable blocks include a plurality of subsets to be interconnected by wires. The set of movable blocks have an initial placement. Further steps include initializing a density penalty weight; setting a current placement equal to the initial placement; and determining a total weighted wire length as a function of coordinates of centers of the movable blocks by summing a half perimeter wire length over the plurality of subsets for the current placement. An even further step includes determining a density penalty as a convolution of an indicator function of the current placement and a convolution kernel, via incremental integer computation without use of floating point arithmetic, to improve a speed at which the computer operates. Yet a further step includes moving the movable blocks to minimize a penalty function including the sum of: (i) the total weighted wire length as the function of the coordinates of the centers of the movable blocks, and (ii) the product of the density penalty weight and the density penalty, to obtain a revised placement. The method still further includes setting the current placement equal to the revised placement; increasing the density penalty weight; and repeating the steps of determining the density penalty, moving the movable blocks, setting the current placement equal to the revised placement, and increasing the density penalty weight, until a maximum value of the density penalty weight is reached or the density penalty approaches zero, to obtain a further revised placement.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

One or more embodiments of the invention or elements thereof can be implemented in the form of a computer program product including a computer readable storage medium with computer usable program code for performing the method steps indicated. Furthermore, one or more embodiments of the invention or elements thereof can be implemented in the form of a system (or apparatus) (e.g., a computer) including a memory, and at least one processor that is coupled to the memory and operative to perform exemplary method steps. Yet further, in another aspect, one or more embodiments of the invention or elements thereof can be implemented in the form of means for carrying out one or more of the method steps described herein; the means can include (i) hardware module(s), (ii) software module(s) stored in a computer readable storage medium (or multiple such media) and implemented on a hardware processor, or (iii) a combination of (i) and (ii); any of (i)-(iii) implement the specific techniques set forth herein.

Techniques of the present invention can provide substantial beneficial technical effects. For example, one or more embodiments may provide one or more of the following advantages:

use of incremental integer computation to accelerate the computation of convolution, which renders feasible the use of convolution of density over population instead of single point density over population;

better design/performance of resulting integrated circuit chips;

improved performance of a computer carrying out electronic design analysis (EDA) by rapid computation of convolution, and the absence of rounding errors during incremental updates of density penalty function.

These and other features and advantages of the present invention will become apparent from the following detailed description of illustrative embodiments thereof, which is to be read in connection with the accompanying drawings.

BRIEF DESCRIPTION OF THE DRAWINGS

FIG. 4 shows a formula for total weighted wire length, useful in placement according to aspects of the invention;

FIG. 5 shows a formula for density penalty, useful in placement according to aspects of the invention;

DETAILED DESCRIPTION

Figure 1:
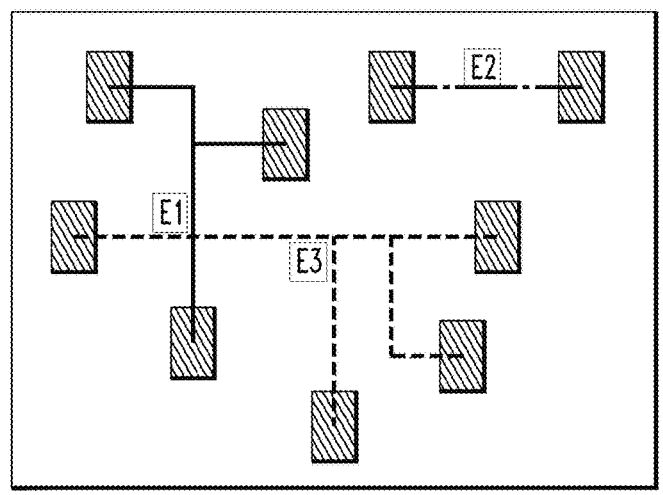
FIG. 1 shows a circuit in placement, wherein placement can be effectuated by aspects of the invention.

One or more embodiments advantageously provide techniques for minimization of half perimeter wire length under maximum density constraint for placement of blocks of a VLSI design. Referring to FIG. 1, a circuit 101 in placement is represented as a set of rectangles or blocks (shown cross-hatched and not separately numbered to avoid clutter) with given widths and heights which must fit into a bounding box (outer rectangle not separately numbered to avoid clutter). This set is denoted by V. In addition to V itself, a number of subsets of V: E1, E2 . . . Em (in the figure, E1, E2, E3) are given and are called nets. Blocks of each net should be connected by wires (lines shown connecting cross-hatched rectangles and not separately numbered to avoid clutter). A good placement should minimize the total wire length without creating regions overpopulated with blocks anywhere in the design.

Figure 2:
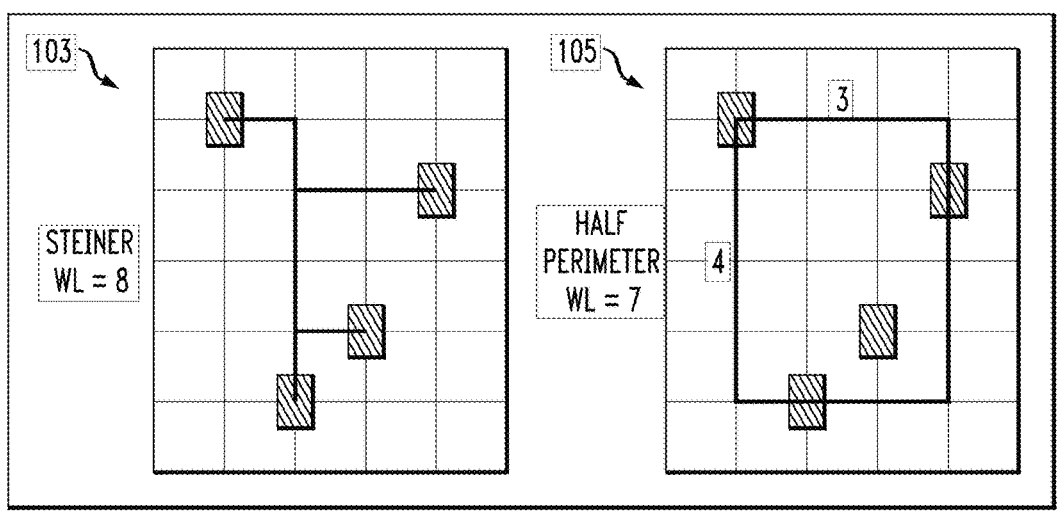
FIG. 2 shows Steiner wire length and half perimeter wire length for a placement problem, wherein placement can be effectuated by aspects of the invention.
Figure 3:
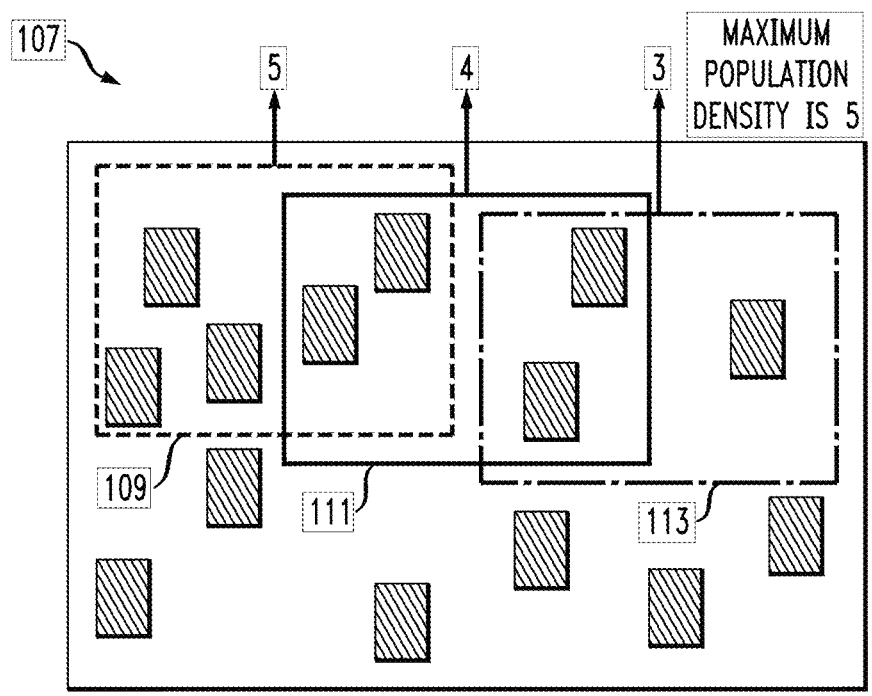
FIG. 3 shows maximum population aspects of placement, wherein placement can be effectuated by aspects of the invention.

Referring now to FIG. 2, as seen at 103, finding an exact minimum wire length, also called Steiner wire length, is a computationally expensive task even if the blocks are fixed, so in current placement tools it is traditionally replaced, as seen at 105, by the Half Perimeter Wire Length (HPWL) approximation:

$HPWL(net):=\max(x\_i)-\min(x\_i)+\max(y\_i)-\min(y\_i)$ $HPWL(design)=summation\_over\_all\_nets(HPWL(net))$ Referring to 107 in FIG. 3, the maximum population can be defined as the maximum area occupied by blocks in a moving square window of a fixed size positioned anywhere within the bounding box (outer rectangle not separately numbered to avoid clutter). Let f be the indicator function of the placement; that is, f is equal to 1 at points covered by blocks and 0 elsewhere. Then, the maximum population is the maximum value of the convolution of f and the indicator function of the window. More generally, the maximum population can be defined as the maximum value of the convolution of f and any non-negative convolution kernel such as a Gaussian bell. In the non-limiting example of FIG. 3, three successive window positions 109, 111, 113 are depicted, and the maximum population density is five (window 109 has 5 blocks; window 111 has 4 blocks; window 113 has 3 blocks).

One or more embodiments advantageously allow positioning of all movable blocks of a given design so that the half perimeter wire length is minimized and the maximum population density constraint is satisfied. One or more embodiments take the following information as input:

the Block-Net hypergraph G(V, E), the sizes of movable blocks and of the design bounding box, and the positions of fixed blocks and the positions of pins in each block with respect to the block's anchor point (e.g. the_lower left corner or the center, but other points could be used if desired).

One or more embodiments produce, as output, the coordinates (x_i, y_i) of lower left corners of all movable blocks with respect to the lower left corner of the bounding box such that HPWL(design) is minimized and the maximum population density constraint is satisfied. One or more embodiments employ finite difference descent over an integer grid where: (i) all blocks' centers are aligned to the integer grid at all times; (ii) one block is attempted to move by one grid point at a time; (iii) a move is accepted if the difference between the objective functions at the old and new locations is positive. Finite difference descent is similar to gradient descent except that there is no need to compute the gradient; the gradient is approximated by the finite difference. Conventional gradient descent needs two inputs; namely, the function and its gradient. Finite difference descent only needs the function.

One or more embodiments employ an ALV Optimization Engine wherein the objective is to minimize total weighted wire length under the maximum density constraint. In one or more embodiments, the Penalty function f(v) (subject to minimization) is the sum of two components, namely, TWWL(v) and α·DP(v):

$f(v):=TWWL(v)+\alpha \cdot DP(v).$

In the above equation, v=(x1, y1, x2, y2, . . . , xn, yn) is a vector of 'x' and 'y' coordinates of centers of all movable objects; TWWL(v) is defined in FIG. 4; and the density penalty DP(v) is defined in FIG. 5. The parameter a increases from effectively 0 to effectively ∞ during the running of the algorithm.

In one or more embodiments, the algorithm includes a series of minimization steps for the values of α exponentially increasing from some very small number to some very large number. For example, a belongs to {0.001, 0.01, 0.1, 1, 10, 100, 1000}. Initially, when α is small, little weight is given to the density penalty, and the algorithm will produce a compact/collapsed design. As a increases, the density penalty comes into play and the design will expand.

One or more embodiments thus minimize TWWL(v) subject to not creating overpopulated regions (the latter being controlled by the density penalty).

In one or more embodiments, during a minimization step, move one movable object at a time to a neighbor bin in the direction of descent of the penalty function chosen among {left, right, bottom, top}. Assuming that the side of the bin is sufficiently small, the minimization step decreases the value of the penalty function $f_\alpha(v)$ until a point is reached where all partial derivatives of $f_\alpha(v)$ are approximately zero (an approximate stationary point of $f_\alpha(v)$).

In one or more embodiments, regarding a termination criterion, the algorithm terminates either when the maximum value of a is reached or when the density penalty becomes zero.

Figure 6:
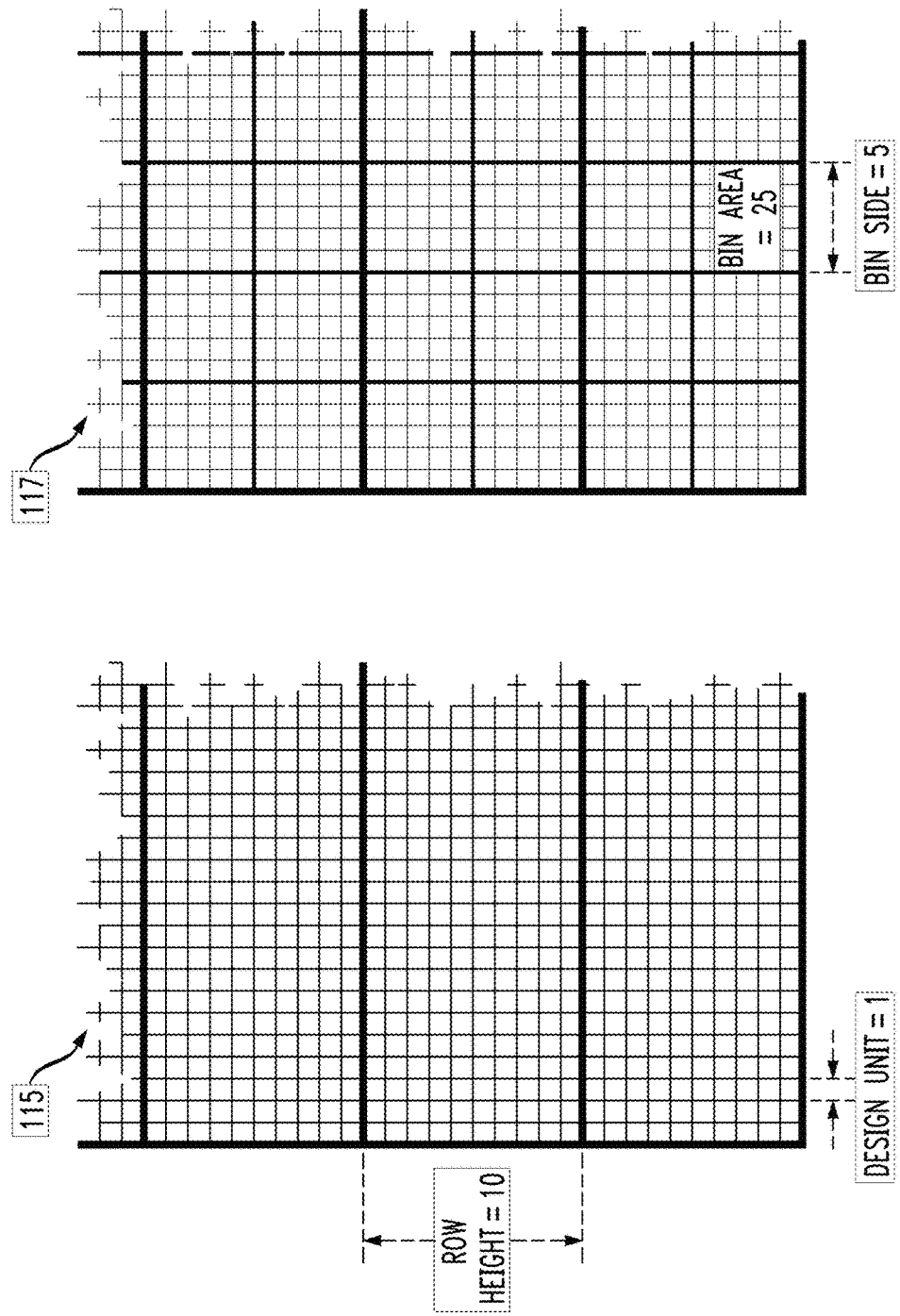
FIG. 6 shows size and critical areas of bins, according to an aspect of the invention.

Referring now to FIG. 6, consider the size and critical area of bins. The length of the side of a bin is a multiple of the design_length_unit and a divisor of the row height. For example, suppose the row_height=10, bin_side=5, and critical_density=60%. Portion 115 of FIG. 6 shows the row_height=10 and design unit=1. Portion 117 of FIG. 6 shows a bin area of 25 corresponding to a bin_side=5. The design length unit is typically based on the minimum granularity of the design (e.g. minimum stepper step size; 2 nm is a non-limiting example). A row size can be, for example, ten times the design length unit. One row by height can, for example, correspond to the size of a typical shape. The formula for the bin critical area is:

$$\text{bin\_critical\_area} := \text{bin\_area} \cdot \text{critical\_density} = 25 \cdot 0.6 = 15.$$

Figure 7:
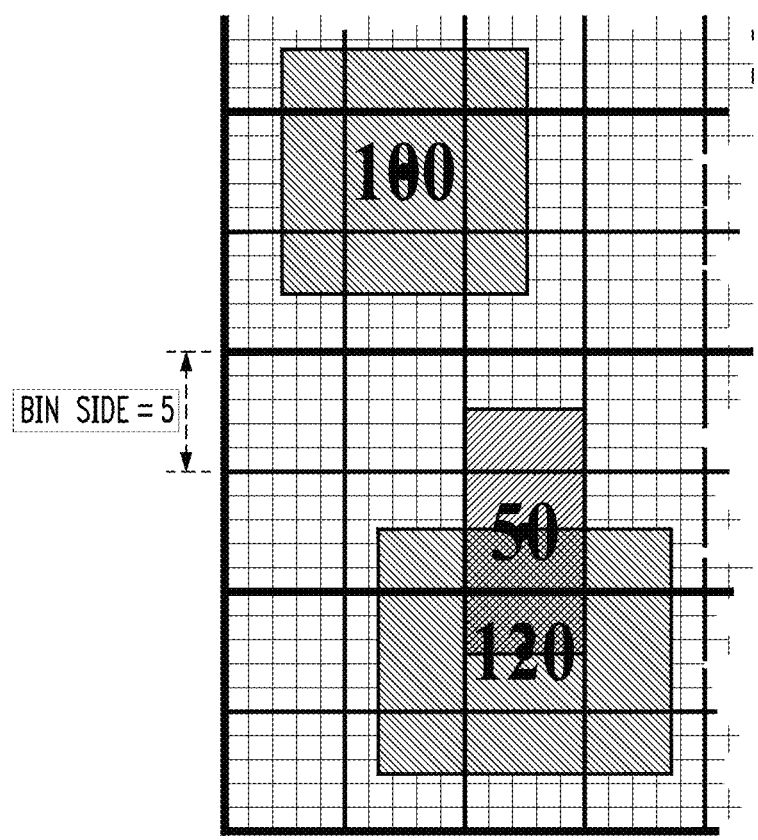
FIG. 7 shows bins occupied areas, according to an aspect of the invention.

Referring now to FIG. 7, consider bins' occupied areas. One or more embodiments assume that a movable object/shape contributes its whole area to the bin where its center belongs. Thus, in FIG. 7, the object with area 100 contributes its whole area to the bin with the bold dot signifying its center; the object with area 50 contributes its whole area to the bin with the bold dot signifying its center; and the object with area 120 contributes its whole area to the bin with the bold dot signifying its center. We have found that, in view of the subsequent convolution, this is a reasonable approximation.

Figure 8:
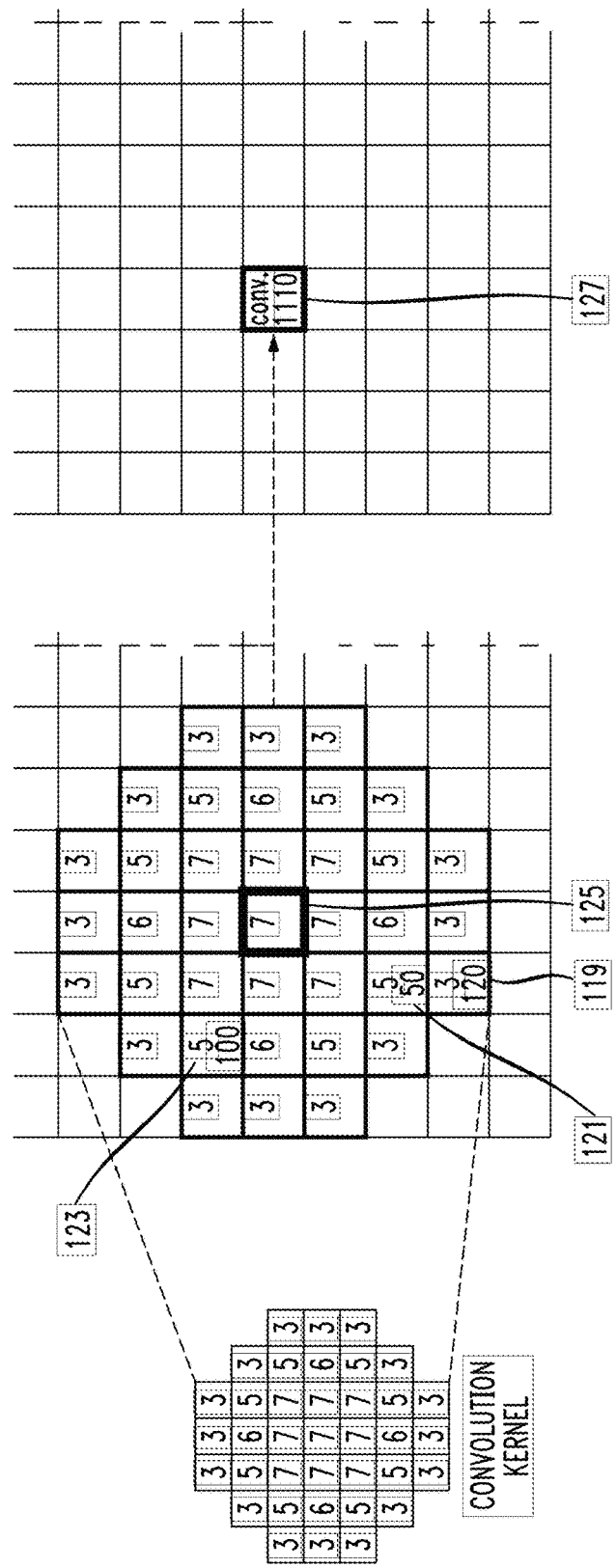
FIG. 8 shows convolution of bins occupied areas, according to an aspect of the invention.

FIG. 8 shows convolution of bins' occupied areas. A convolution kernel is passed over the grid which includes values of 100, 50, and 120 (see also FIG. 7) at locations 123, 121, and 119. The convolution value of 1110 at 127 is obtained by multiplying the values at locations 123, 121, and 119 by the corresponding values in the convolution kernel; namely, 5, 5, and 3, and then summing: 5×100+5×50+3×120. The exemplary kernel (centered at 125) is Gaussian; a pure rectangular window can be used in other embodiments, for example.

Figure 9:
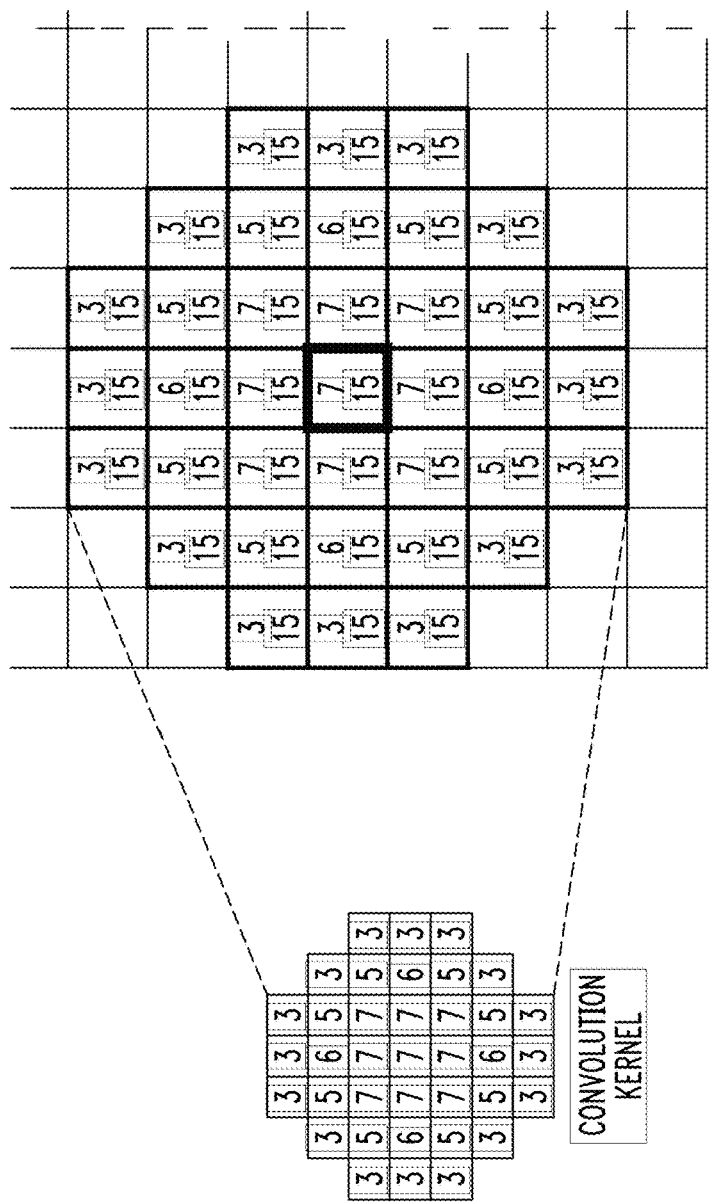
FIG. 9 shows critical convolution value, according to an aspect of the invention.

FIG. 9 depicts the critical convolution value, which is the value of the convolution assuming that each bin has the critical occupied area. The bin critical area is given by:

$$\text{bin\_critical\_area} := \text{bin\_area} \cdot \text{critical\_density} = 25 \cdot 0.6 = 15.$$

The critical convolution value (c.c.v.) is the value of convolution assuming that each bin has the critical occupied area; in the example shown, c.c.v.=2625 (multiply 15 by each value in the convolution kernel and sum up; convolution kernel has 16 "3" values, 8 "5" values, 4 "6" values, and 9 "7" values. Thus, 15(16×3+8×5+4×6+9×7)=2625. In FIG. 9, the top number in each bin in the center view is the value from the convolution kernel, while the bottom number is the bin_critical_area (15).

By choosing bin size so that shapes are not much bigger than bins, the whole area of the shape can be treated as concentrated on its center, as per FIG. 7.

Figure 10:
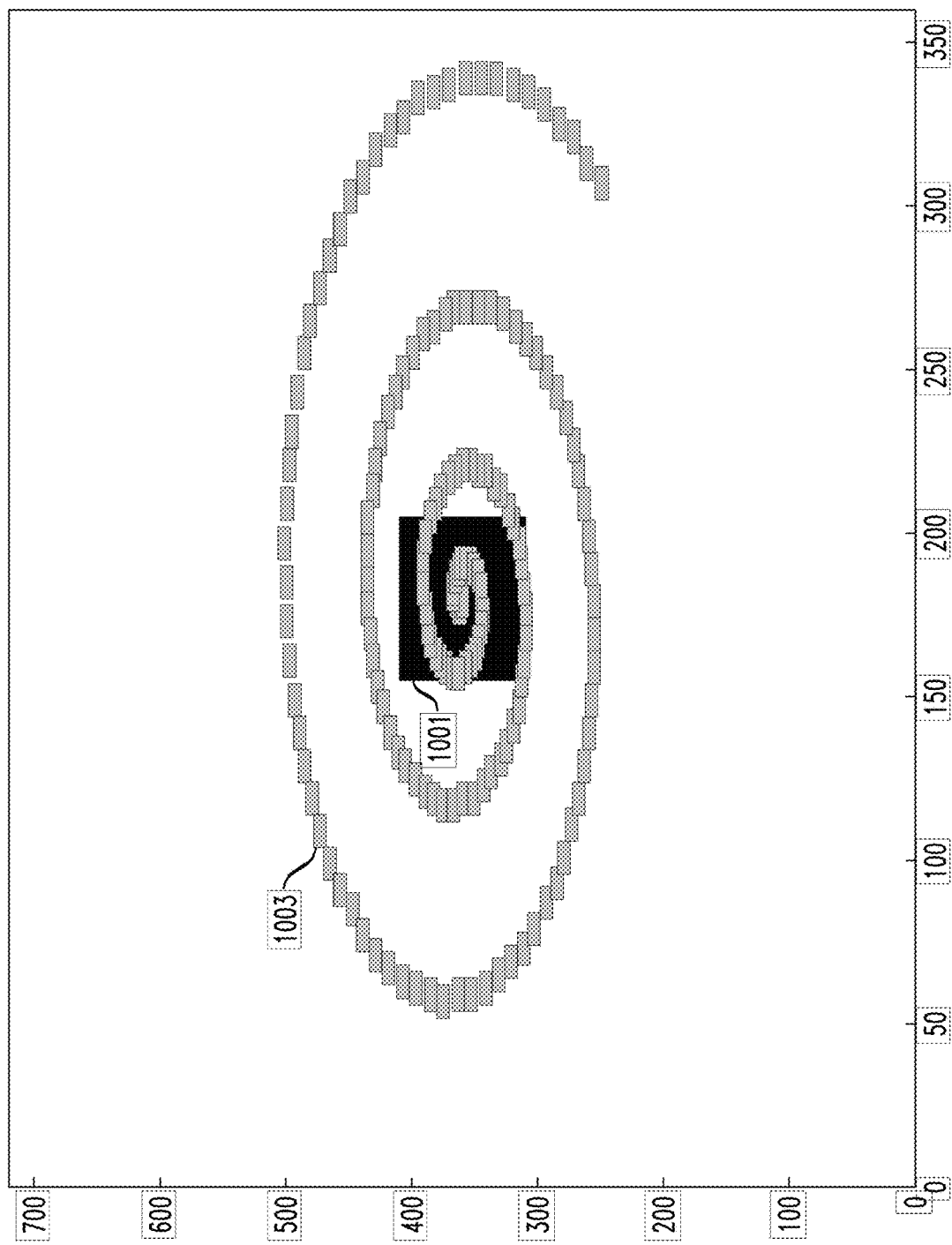
FIG. 10 shows an initial stage of placement on a regular grid with a bulk defect, according to an aspect of the invention.
Figure 11A:
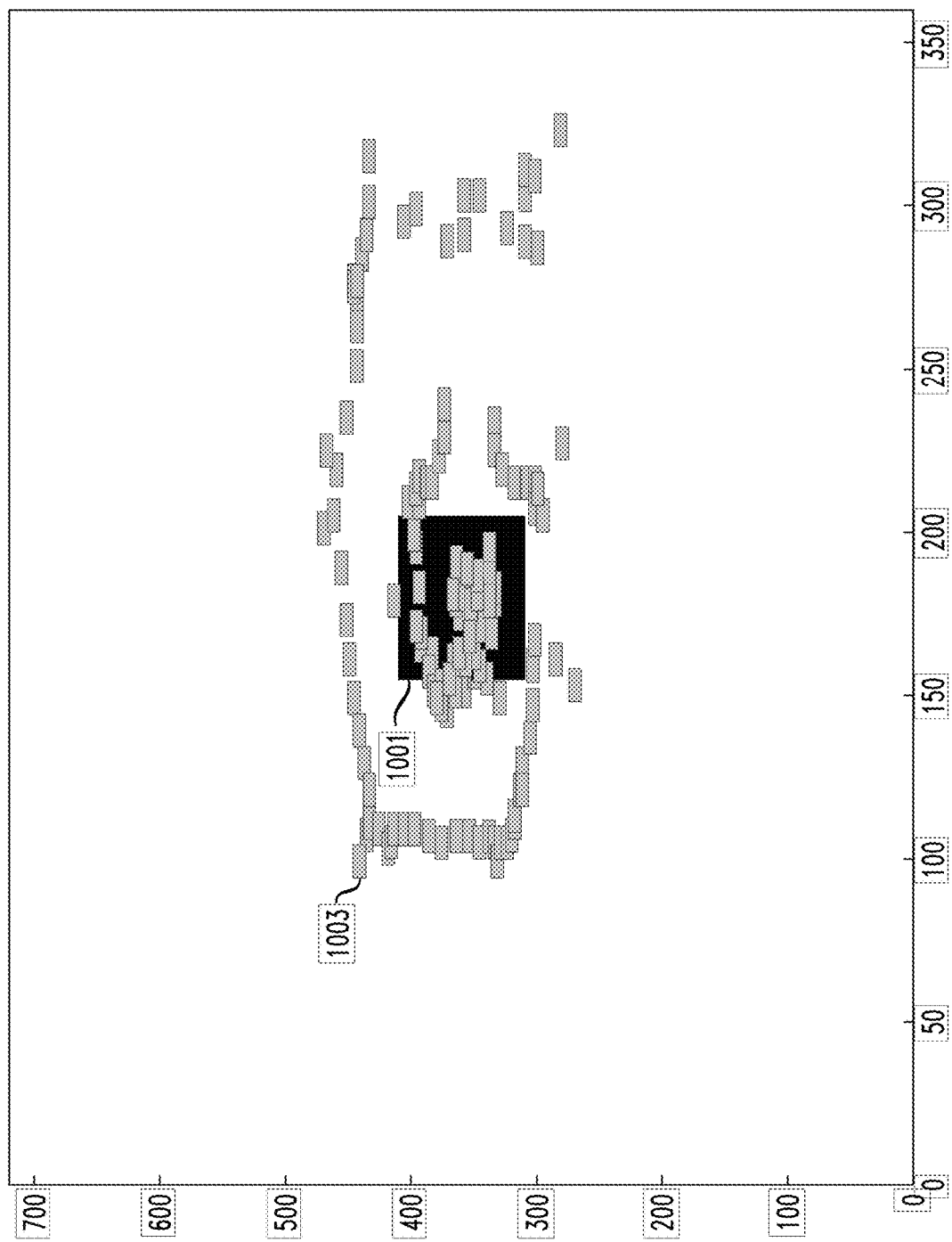
FIGS. 11A, 11B, 11C, and 11D show subsequent stages of placement on a regular grid with a bulk defect, according to an aspect of the invention.
Figure 11B:
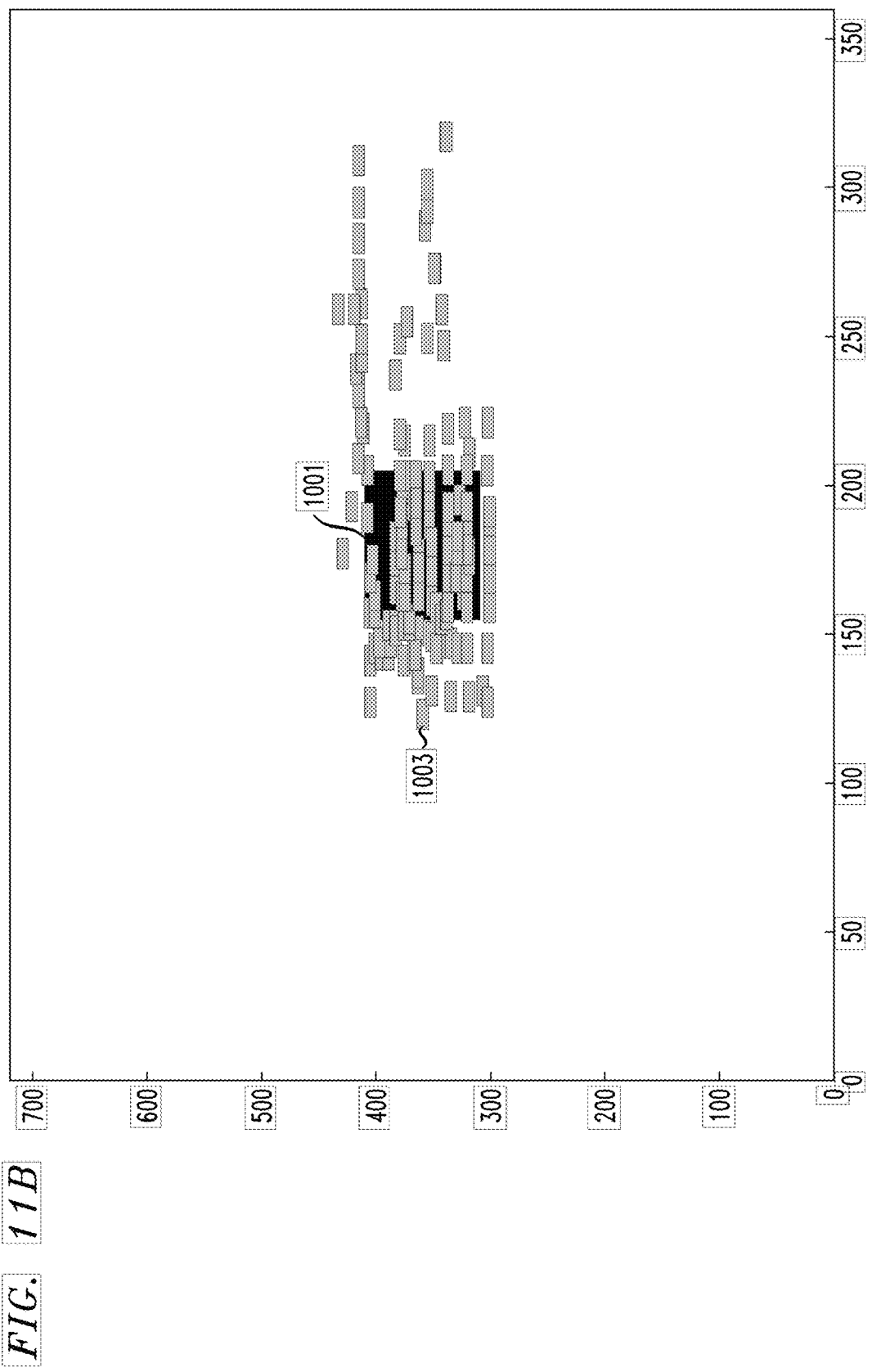
Figure 11C:
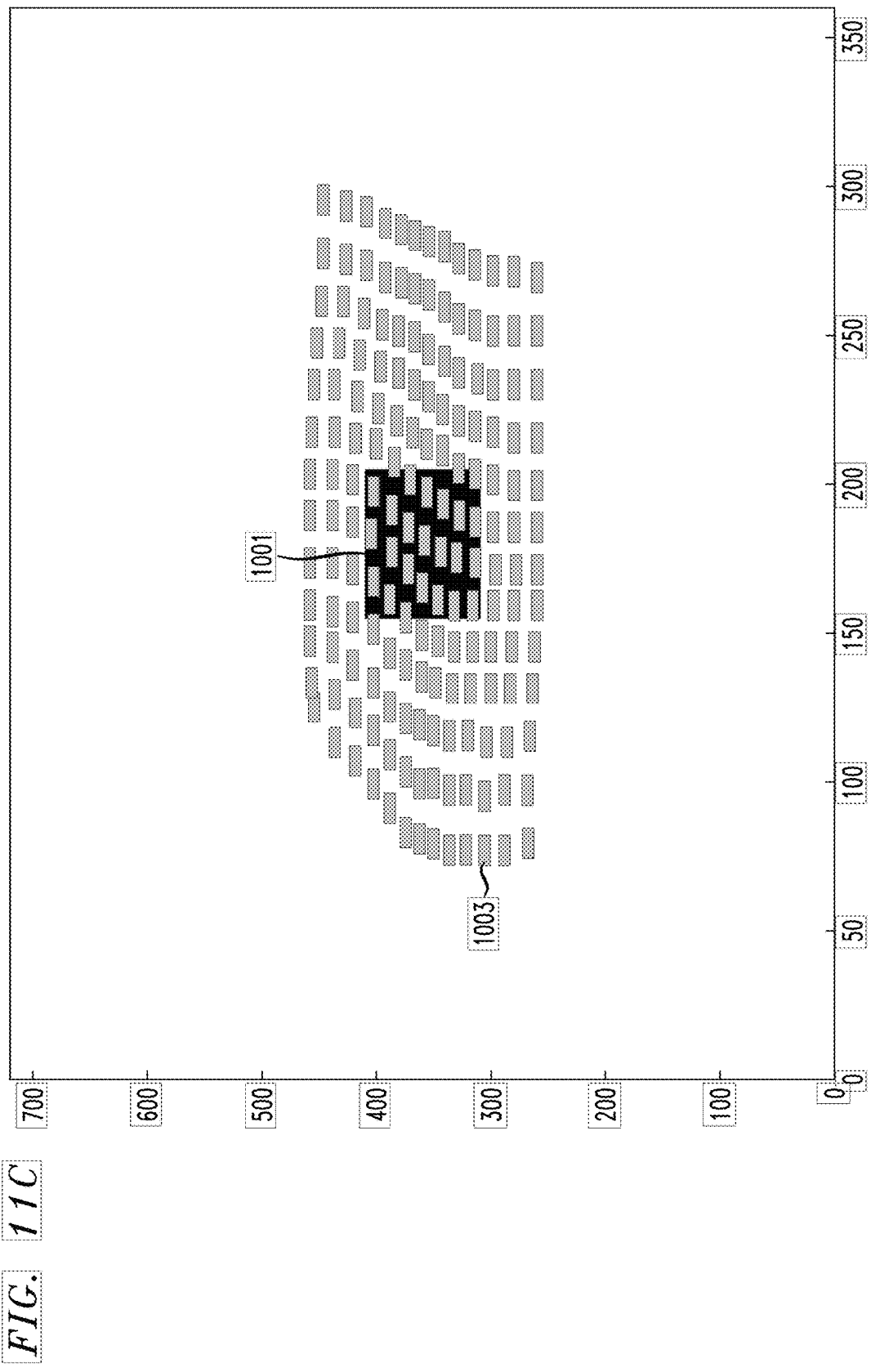
Figure 11D:
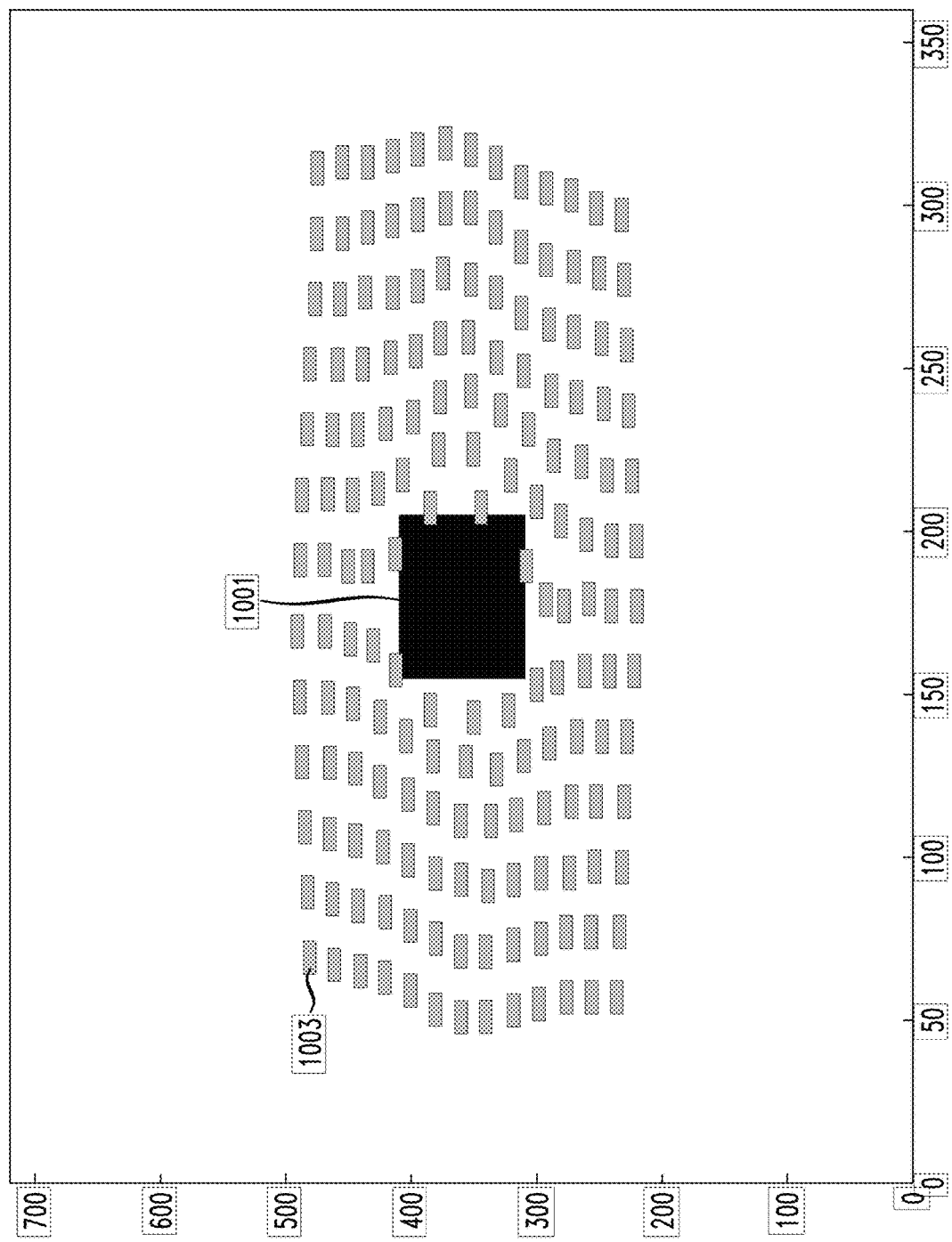

FIG. 10 shows an initial stage of placement of shapes 1003 on a regular grid with a bulk defect 1001 (connections are omitted to avoid clutter). An initial spiral distribution is shown for illustrative purposes. FIGS. 11A, 11B, 11C, and 11D show subsequent stages of placement on the regular grid with the bulk defect. It can be seen how the distribution initially progresses from spiral to compact and then gradually expands as the density penalty comes into play, and migrates away from the defect 1001. FIG. 11D is near-final; the few shapes 1003 still impinging on the defect 1001 would move away in the final placement.

In a non-limiting example, the just-described algorithm (also referred to herein as the ALV algorithm for convenience) fits into the LFDP (Linear Force Driven Placement) placement flow as follows: global placement, followed by iterative local refinement (see, e.g., Natarajan Viswanathan, Member, IEEE, and Chris Chong-Nuen Chu, FastPlace: Efficient Analytical Placement Using Cell Shifting, Iterative Local Refinement, and a Hybrid Net Model, IEEE TRANSACTIONS ON COMPUTER-AIDED DESIGN OF INTEGRATED CIRCUITS AND SYSTEMS, VOL. 24, NO. 5, MAY 2005, pages 722-733, hereby expressly incorporated herein by reference in its entirety for all purposes), followed by the ALV algorithm, followed by legalization, followed by detailed placement. In an alternative approach, the just-described ALV algorithm can replace all placement steps from global placement to detailed placement. However, we have found that the overall runtime comparison is in favor of insertion, which gives ALV a "warm start" at a comparatively small runtime cost.

Figures 12, 13:
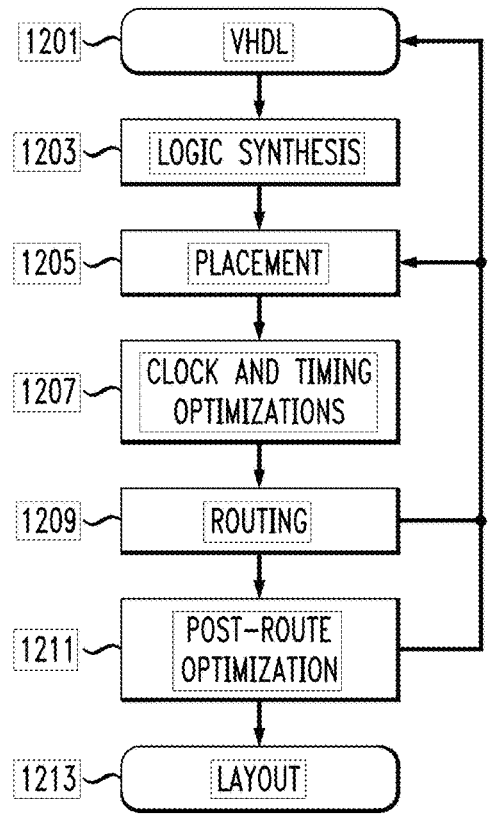
FIG. 12 shows a flow chart of placement within a VLSI physical synthesis process, according to an aspect of the invention.
FIG. 13 presents a table comparing results using embodiments of the invention versus current techniques, it being understood that the table is exemplary and other embodiments could achieve different results.

Refer now to FIG. 12, which depicts a simplified physical synthesis flow, and consider how placement is used in physical synthesis. In VLSI digital design, a netlist (from logic synthesis) includes a network of combinational logic gates and memory elements such as latches/flip-flops. In step 1201, describe the design in a language such as VHDL. In step 1203, carry out logic synthesis. In step 1205, carry out placement. Regarding placement, the netlist is presented as sea-of-standard cells (nodes) with connectivity matrix (edges) for placement during physical design. The placement stage determines the location of cells with the objective to optimize wire the length while spreading cells to resolve overlaps and meet the density constraint. Heretofore, current large-scale placement approaches use floating point-based analytical/mathematical techniques to solve a closed form model of Half-Perimeter Wirelength (HPWL) as an estimate for routed wire length. We have noted that a placement solution derived early in the flow significantly influences the quality of the final synthesized layout across timing, congestion, and power metrics.

In step 1207, carry out clock and timing optimizations. In step 1209, carry out routing. In step 1211, carry out post-route optimization. The results of steps 1209 and/or 1211 can be used to iterate, with feedback to steps 1201 and/or 1205. The ultimate result is layout 1213.

Current placement flows typically include initial analytical global placement, local placement refinement, legalization, and detailed placement. Current widely-adopted analytical global placement often employs local refinement techniques (e.g. FastPlace: An Analytical Placer for Large-scale VLSI Circuits; DPlace2.0: A stable and efficient analytical placement based on diffusion; MAPLE: Multilevel Adaptive PLacEment for Mixed-Size Designs). One or more embodiments advantageously provide a high-quality placement refinement method that is applicable and relevant to most modern placement tools in physical synthesis flows.

The table of FIG. 13 shows a non-limiting example of benefits of one or more embodiments as compared to the prior art, for four example designs at the 14 nm technology node. The column "No ALV" shows the wire length in design units and the CPU time for each of the four designs, using prior art techniques (without convolution). The column "ALV" shows the wire length in design units and the CPU time (in seconds) for each of the four designs, using the ALV algorithm disclosed herein. The final column shows the percentage improvement in the half perimeter wire length using the ALV algorithm. Note that the CPU time for the ALV algorithm with convolution is longer than for prior art techniques without convolution; however, if convolution were done with prior-art floating point techniques, the CPU time would be prohibitively large. One or more embodiments are thus faster than prior art techniques using convolution with floating point arithmetic, and superior (i.e., smaller HPWL) than prior art techniques not using convolution.

One or more embodiments advantageously provide a purely integer arithmetic method for placing all movable blocks of a given design so that the half perimeter wire length is minimized and the maximum population density constraint is satisfied. In one or more embodiments, no floating point numbers are used in the main loop. The DensityPenalty(v) is computed via convolution of the indicator function of the placement and a convolution kernel. The indicator function of the placement is equal to 1 at points covered by blocks and 0 elsewhere. The convolution kernel may be an indicator of a rectangle (sliding window) or a smooth Gaussian-like surface. The integral nature of the method allows fast unlimited incremental updates of the density penalty without loss of precision. In one or more embodiments, piecewise quadratic smooth approximation to MAX and MIN is used, instead of MAX and MIN functions themselves, for the computation of HPWL(v), in order to achieve better convergence.

In one or more instances, local optimization complements the action of piecewise quadratic smoothing by optimizing wire length inside small proximities of each block, thus compensating for the loss of precision due to the smoothing. In one or more embodiments, all blocks' centers are aligned to the integer grid at all times; one block is attempted to move by one grid point at a time; and a move is accepted if the difference between the objective functions at old and new locations is positive. No gradient computation required.

It should be emphasized that one or more embodiments are purely integer based. The finite difference step is aligned with the step of the design grid. This permits avoiding multiple local minima of the objective function which are present at the bin boundaries in any floating point based minimization method.

It will be appreciated that one or more embodiments advantageously employ purely integer computations; use a convolution kernel for accurate density computation and/or use a smooth quadratic based approximation to max/min function for better convergence. Advantageously, the use of purely integer arithmetic, which allows unlimited incremental updates to the wire length/density penalty/convolution function without loss of precision, in turn allows fast computation of the convolution function. One or more embodiments employ finite difference techniques. One or more embodiments do not rely on any real number computation or the concept of differentiability or continuity and are purely integer based arithmetic. One or more embodiments use $C^{(1)}$ continuous piecewise quadratic approximation of minimum/maximum. The incremental update permits rapid calculation of the convolution of the overpopulation of the design.

Thus, one or more embodiments advantageously improve the quality of placement in terms of wire length. One or more embodiments are able to use convolution to compute the density penalty, because of the use of purely integer arithmetic—otherwise, convolution is not feasible due to excess computation times (one or more embodiments are about two orders of magnitude faster than prior art floating point techniques, because the use of integer calculations allows incremental update of the convolution function).

Indeed, one or more embodiments lead to at least two types of technical improvement: (i) the computer running the electronic design analysis (EDA) runs faster because of use of integer calculations allows incremental update of the convolution function with zero precision loss; and (ii) IC chips designed with techniques according to one or more embodiments will be superior to those designed with prior art techniques.

In one or more embodiments, the size of the convolution window depends on the technology node; e.g., 65 nm, 14 nm, etc. The user will typically be a skilled designer who will be able to select the size of the window over which the density should be averaged, based on experience in the field. In a non-limiting example, a nine-by-nine row rectangular window is used; a row can be, for example, ten design units. Gaussian kernels or rectangular windows of different size can be used in other embodiments, and row size can be different as well. One design unit is 80 nm in the 14 nm node. One design unit is 64 nm in the 7 nm node. The skilled artisan is familiar with the concept of design units and can determine same for a given technology node.

It should again be emphasized that one or more embodiments render feasible the use of convolution of density over population instead of single point density over population, because of using incremental integer computation to accelerate the computation of convolution.

Given the discussion thus far, it will be appreciated that, in general terms, an exemplary method, implemented at least in part on a computer, according to an aspect of the invention, includes representing a putative circuit design as a set of movable blocks of predetermined size which must fit into a bounding box (see FIG. 1). The set of movable blocks includes a plurality of subsets E1, E2, E3 . . . to be interconnected by wires, and the set of movable blocks has an initial placement (e.g., FIG. 10). Any desired placement can be used for the initial placement, even including arbitrary or random placements. A further step includes initializing a density penalty weight α (say, to a near-zero value such as 0.001). A still further step includes setting a current placement equal to the initial placement (i.e., a first round of calculations will be performed on the initial placement).

A still further step includes determining a total weighted wire length as a function of coordinates of centers of the movable blocks by summing a half perimeter wire length over the plurality of subsets for the current placement. See equation of FIG. 4. An even further step includes determining a density penalty as a convolution of an indicator function of the current placement and a convolution kernel, via incremental integer computation without use of floating point arithmetic, to improve a speed at which the computer operates. See equation of FIG. 5. Yet a further step includes moving the movable blocks to minimize a penalty function including a sum of: (i) the total weighted wire length as the function of the coordinates of the centers of the movable blocks, and (ii) a product of the density penalty weight α and the density penalty, to obtain a revised placement.

Iteration then proceeds by setting the current placement equal to the revised placement (i.e. doing next round of calculations on the updated placement), increasing the density penalty weight α, and repeating the steps of determining the density penalty, moving the movable blocks, setting the current placement equal to the revised placement, and increasing the density penalty weight, until a maximum value of the density penalty weight is reached or the density penalty approaches zero, to obtain a further revised placement.

In one or more embodiments, a further step includes fabricating a physical integrated circuit in accordance with said further revised placement. One non-limiting specific example of accomplishing this is described elsewhere herein in connection with FIGS. 12, 15, and 16. For example, a design structure, based on the further revised placement, is provided to fabrication equipment to facilitate fabrication of a physical integrated circuit in accordance with the design structure.

In one or more embodiments, increasing the density penalty weight includes increasing the density penalty weight exponentially; in a non-limiting example, the initial density penalty weight is 0.001 and the maximum value of the density penalty weight is 1000, such that the sequence is 0.001, 0.01, 0.1, 1, 10, 100, 1000.

In one or more instances, the bounding box is divided into a plurality of bins as seen in FIGS. 6 and 7, and moving the movable blocks to minimize the penalty function includes moving one of the movable objects at a time from a current one of the bins to a neighboring one of the bins in a direction of descent of the penalty function. Advantageously, in one or more embodiments, moving in the direction of the descent is carried out without gradient computation.

In the step of determining the density penalty, the convolution kernel can be a uniform rectangle as in FIG. 3 or can be Gaussian as in FIGS. 8 and 9.

Referring to FIG. 12, in one or more embodiments, the method further includes rendering the putative circuit design in a design language (such as VHDL in step 1201); and carrying out logic synthesis 1203 on the putative circuit design rendered in the design language to determine the number of blocks in the set of movable blocks, the predetermined size of the blocks, and a size of the bounding box (the current, and thus heat dissipation, can be estimated at this stage; thermal considerations will then lead to appropriate values for the density penalty). After placement 1205 in accordance with aspects of the invention, further steps can include carrying out clock and timing optimizations on the further revised placement, as at 1207; carrying out routing based on the clock and timing optimizations, as at 1209; carrying out post-route optimization subsequent to the routing, as at 1211; and preparing a layout based on the post-route optimization, as at 1213.

Figure 15:
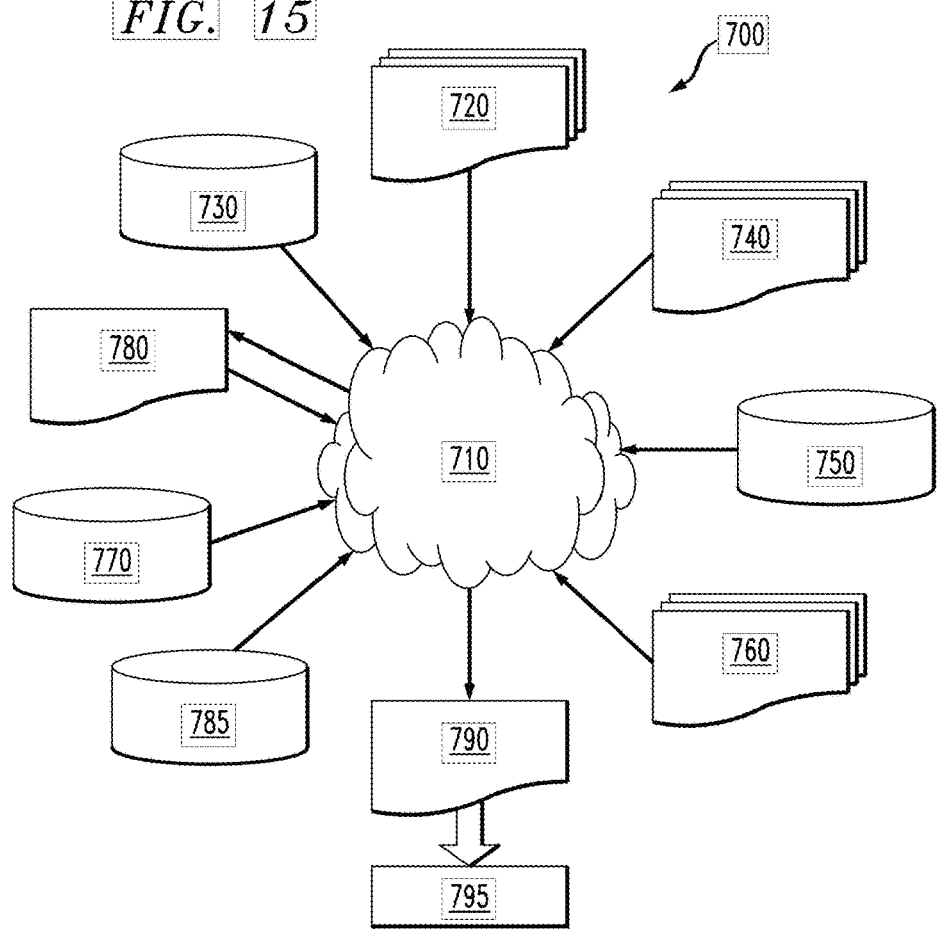
FIG. 15 is a flow diagram of a design process used in semiconductor design, manufacture, and/or test.
Figure 16:
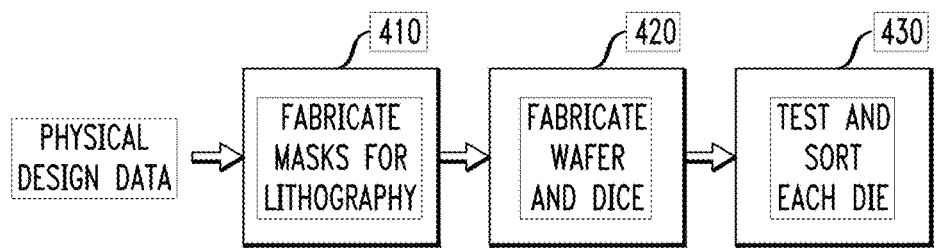
FIG. 16 shows further aspects of IC fabrication from physical design data.

In one or more embodiments, the layout is instantiated as a design structure. See discussion of FIG. 15. A physical integrated circuit is then fabricated in accordance with the design structure. See again discussion of FIG. 15. Refer also to FIG. 16. Once the physical design data is obtained, based, in part, on the placement processes described herein, an integrated circuit designed in accordance therewith can be fabricated according to known processes that are generally described with reference to FIG. 16. Generally, a wafer with multiple copies of the final design is fabricated and cut (i.e., diced) such that each die is one copy of the integrated circuit. At block 410, the processes include fabricating masks for lithography based on the finalized physical layout. At block 420, fabricating the wafer includes using the masks to perform photolithography and etching. Once the wafer is diced, testing and sorting each die is performed at 430 to filter out any faulty die.

In one or more embodiments, the indicator function includes a value of unity at points covered by the movable blocks and zero elsewhere.

In one or more embodiments, determining the total weighted wire length as the function of coordinates of centers of the movable blocks, by summing the half perimeter wire length over the plurality of subsets for the current placement, includes using a piecewise quadratic smooth approximation to maximum and minimum.

One or more embodiments include a computer including a memory 604; and at least one processor 602, coupled to the memory, and operative to carry out or otherwise facilitate any one, some, or all of the method steps described herein.

In one or more embodiments, the performance (speed) of this computer is improved by determining the density penalty as a convolution of an indicator function of the current placement and a convolution kernel, via incremental integer computation without use of floating point arithmetic, as described elsewhere herein. Furthermore, referring to FIG. 15, in one or more embodiments the at least one processor is operative to generate a design structure for the integrated circuit design in accordance with the placement analysis, and in at least some embodiments, the at least one processor is further operative to control integrated circuit manufacturing equipment to fabricate a physical integrated circuit in accordance with the design structure. Thus, the layout can be instantiated as a design structure, and the design structure can be provided to fabrication equipment to facilitate fabrication of a physical integrated circuit in accordance with the design structure. The physical integrated circuit will be improved (reduced HPWL) compared to circuits designed using prior art techniques.

Exemplary System

One or more embodiments of the invention, or elements thereof, can be implemented in the form of an apparatus including a memory and at least one processor that is coupled to the memory and operative to perform exemplary method steps.

Figure 14:
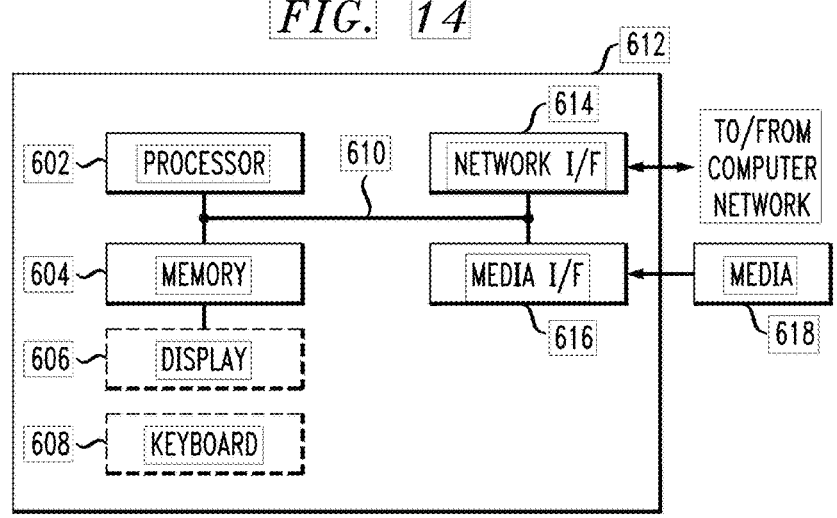
FIG. 14 depicts a computer system that may be useful in implementing one or more aspects and/or elements of the invention.

One or more embodiments can make use of software running on a general purpose computer or workstation. With reference to FIG. 14, such an implementation might employ, for example, a processor 602, a memory 604, and an input/output interface formed, for example, by a display 606 and a keyboard 608. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, one or more mechanisms for inputting data to the processing unit (for example, mouse), and one or more mechanisms for providing results associated with the processing unit (for example, printer). The processor 602, memory 604, and input/output interface such as display 606 and keyboard 608 can be interconnected, for example, via bus 610 as part of a data processing unit 612. Suitable interconnections, for example via bus 610, can also be provided to a network interface 614, such as a network card, which can be provided to interface with a computer network, and to a media interface 616, such as a diskette or CD-ROM drive, which can be provided to interface with media 618.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 602 coupled directly or indirectly to memory elements 604 through a system bus 610. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including but not limited to keyboards 608, displays 606, pointing devices, and the like) can be coupled to the system either directly (such as via bus 610) or through intervening I/O controllers (omitted for clarity).

Network adapters such as network interface 614 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 612 as shown in FIG. 6) running a server program. It will be understood that such a physical server may or may not include a display and keyboard.

It should be noted that any of the methods described herein can include an additional step of providing a system comprising distinct software modules embodied on a computer readable storage medium; the modules can include, for example, any or all of the elements depicted in the block diagrams and/or described herein. The method steps can then be carried out using the distinct software modules/routines and/or sub-modules/subroutines of the system, as described above, executing on one or more hardware processors 602. Further, a computer program product as described below can include code adapted to be implemented to carry out one or more method steps described herein, including the provision of the system with the distinct software modules.

In any case, it should be understood that the components illustrated herein may be implemented in various forms of hardware, software, or combinations thereof; for example, application specific integrated circuit(s) (ASICS), functional circuitry, one or more appropriately programmed general purpose digital computers with associated memory, and the like. Given the teachings of the invention provided herein, one of ordinary skill in the related art will be able to contemplate other implementations of the components of the invention.

Computer Program Products

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Exemplary Design Process Used in Semiconductor Design, Manufacture, and/or Test

One or more embodiments integrate the timing analysis techniques herein with semiconductor integrated circuit design simulation, test, layout, and/or manufacture. In this regard, FIG. 15 shows a block diagram of an exemplary design flow 700 used for example, in semiconductor IC logic design, simulation, test, layout, and manufacture. Design flow 700 includes processes, machines and/or mechanisms for processing design structures or devices to generate logically or otherwise functionally equivalent representations of design structures and/or devices, such as those that can be analyzed using timing analysis or the like. The design structures processed and/or generated by design flow 700 may be encoded on machine-readable storage media to include data and/or instructions that when executed or otherwise processed on a data processing system generate a logically, structurally, mechanically, or otherwise functionally equivalent representation of hardware components, circuits, devices, or systems. Machines include, but are not limited to, any machine used in an IC design process, such as designing, manufacturing, or simulating a circuit, component, device, or system. For example, machines may include: lithography machines, machines and/or equipment for generating masks (e.g. e-beam writers), computers or equipment for simulating design structures, any apparatus used in the manufacturing or test process, or any machines for programming functionally equivalent representations of the design structures into any medium (e.g. a machine for programming a programmable gate array).

Design flow 700 may vary depending on the type of representation being designed. For example, a design flow 700 for building an application specific IC (ASIC) may differ from a design flow 700 for designing a standard component or from a design flow 700 for instantiating the design into a programmable array, for example a programmable gate array (PGA) or a field programmable gate array (FPGA) offered by Altera® Inc. or Xilinx® Inc.

FIG. 15 illustrates multiple such design structures including an input design structure 720 that is preferably processed by a design process 710. Design structure 720 may be a logical simulation design structure generated and processed by design process 710 to produce a logically equivalent functional representation of a hardware device. Design structure 720 may also or alternatively comprise data and/or program instructions that when processed by design process 710, generate a functional representation of the physical structure of a hardware device. Whether representing functional and/or structural design features, design structure 720 may be generated using electronic computer-aided design (ECAD) such as implemented by a core developer/designer. When encoded on a gate array or storage medium or the like, design structure 720 may be accessed and processed by one or more hardware and/or software modules within design process 710 to simulate or otherwise functionally represent an electronic component, circuit, electronic or logic module, apparatus, device, or system. As such, design structure 720 may comprise files or other data structures including human and/or machine-readable source code, compiled structures, and computer executable code structures that when processed by a design or simulation data processing system, functionally simulate or otherwise represent circuits or other levels of hardware logic design. Such data structures may include hardware-description language (HDL) design entities or other data structures conforming to and/or compatible with lower-level HDL design languages such as Verilog and VHDL, and/or higher level design languages such as C or C++.

Design process 710 preferably employs and incorporates hardware and/or software modules for synthesizing, translating, or otherwise processing a design/simulation functional equivalent of components, circuits, devices, or logic structures to generate a Netlist 780 which may contain design structures such as design structure 720. Netlist 780 may comprise, for example, compiled or otherwise processed data structures representing a list of wires, discrete components, logic gates, control circuits, I/O devices, models, etc. that describes the connections to other elements and circuits in an integrated circuit design. Netlist 780 may be synthesized using an iterative process in which netlist 780 is resynthesized one or more times depending on design specifications and parameters for the device. As with other design structure types described herein, netlist 780 may be recorded on a machine-readable data storage medium or programmed into a programmable gate array. The medium may be a nonvolatile storage medium such as a magnetic or optical disk drive, a programmable gate array, a compact flash, or other flash memory. Additionally, or in the alternative, the medium may be a system or cache memory, buffer space, or other suitable memory.

Design process 710 may include hardware and software modules for processing a variety of input data structure types including Netlist 780. Such data structure types may reside, for example, within library elements 730 and include a set of commonly used elements, circuits, and devices, including models, layouts, and symbolic representations, for a given manufacturing technology (e.g., different technology nodes, 32 nm, 45 nm, 90 nm, etc.). The data structure types may further include design specifications 740, characterization data 750, verification data 760, design rules 770, and test data files 785 which may include input test patterns, output test results, and other testing information. Design process 710 may further include, for example, standard mechanical design processes such as stress analysis, thermal analysis, mechanical event simulation, process simulation for operations such as casting, molding, and die press forming, etc. One of ordinary skill in the art of mechanical design can appreciate the extent of possible mechanical design tools and applications used in design process 710 without deviating from the scope and spirit of the invention. Design process 710 may also include modules for performing standard circuit design processes such as timing analysis, verification, design rule checking, place and route operations, etc. Improved placement can be performed as described herein.

Design process 710 employs and incorporates logic and physical design tools such as HDL compilers and simulation model build tools to process design structure 720 together with some or all of the depicted supporting data structures along with any additional mechanical design or data (if applicable), to generate a second design structure 790. Design structure 790 resides on a storage medium or programmable gate array in a data format used for the exchange of data of mechanical devices and structures (e.g. information stored in a IGES, DXF, Parasolid XT, JT, DRG, or any other suitable format for storing or rendering such mechanical design structures). Similar to design structure 720, design structure 790 preferably comprises one or more files, data structures, or other computer-encoded data or instructions that reside on data storage media and that when processed by an ECAD system generate a logically or otherwise functionally equivalent form of one or more IC designs or the like. In one embodiment, design structure 790 may comprise a compiled, executable HDL simulation model that functionally simulates the devices to be analyzed.

Design structure 790 may also employ a data format used for the exchange of layout data of integrated circuits and/or symbolic data format (e.g. information stored in a GDSII (GDS2), GL1, OASIS, map files, or any other suitable format for storing such design data structures). Design structure 790 may comprise information such as, for example, symbolic data, map files, test data files, design content files, manufacturing data, layout parameters, wires, levels of metal, vias, shapes, data for routing through the manufacturing line, and any other data required by a manufacturer or other designer/developer to produce a device or structure as described herein (e.g., .lib files). Design structure 790 may then proceed to a stage 795 where, for example, design structure 790: proceeds to tape-out, is released to manufacturing, is released to a mask house, is sent to another design house, is sent back to the customer, etc.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, implemented at least in part on a computer, comprising:
 representing a putative circuit design as a set of movable blocks of predetermined size which must fit into a bounding box, said set of movable blocks comprising a plurality of subsets to be interconnected by wires, said set of movable blocks having an initial placement;
 initializing a density penalty weight;
 setting a current placement equal to said initial placement;
 determining a total weighted wire length as a function of coordinates of centers of said movable blocks by summing a half perimeter wire length over said plurality of subsets for said current placement;
 determining a density penalty as a convolution of an indicator function of said current placement and a convolution kernel, via incremental integer computation without use of floating point arithmetic, to improve a speed at which said computer operates;
 moving said movable blocks to minimize a penalty function comprising a sum of:
  said total weighted wire length as said function of said coordinates of said centers of said movable blocks, and
  a product of said density penalty weight and said density penalty,
 to obtain a revised placement;
 setting said current placement equal to said revised placement;
 increasing said density penalty weight; and
 repeating said steps of determining said density penalty, moving said movable blocks, setting said current placement equal to said revised placement, and increasing said density penalty weight, until a maximum value of said density penalty weight is reached or said density penalty approaches zero, to obtain a further revised placement.

2. The method of claim 1, further comprising fabricating a physical integrated circuit in accordance with said further revised placement.

3. The method of claim 1, wherein increasing said density penalty weight comprises increasing said density penalty weight exponentially.

4. The method of claim 3, wherein said initial density penalty weight comprises 0.001 and said maximum value of said density penalty weight comprises 1000.

5. The method of claim 1 wherein said bounding box is divided into a plurality of bins, and wherein moving said movable blocks to minimize said penalty function comprises:
 moving one of said movable objects at a time from a current one of said bins to a neighboring one of said bins in a direction of descent of said penalty function.

6. The method of claim 5, wherein said moving in said direction of said descent is carried out without gradient computation.

7. The method of claim 1, wherein, in said step of determining said density penalty, said convolution kernel comprises a uniform rectangle.

8. The method of claim 1, wherein, in said step of determining said density penalty, said convolution kernel is Gaussian.

9. The method of claim 1, further comprising:
rendering said putative circuit design in a design language; and
carrying out logic synthesis on said putative circuit design rendered in said design language to determine a number of blocks in said set of movable blocks, said predetermined size of said blocks, and a size of said bounding box.

10. The method of claim 9, further comprising:
carrying out clock and timing optimizations on said further revised placement;
carrying out routing based on said clock and timing optimizations;
carrying out post-route optimization subsequent to said routing; and
preparing a layout based on said post-route optimization.

11. The method of claim 10, further comprising:
instantiating said layout as a design structure.

12. The method of claim 11, further comprising fabricating a physical integrated circuit in accordance with said design structure.

13. The method of claim 1, wherein said indicator function comprises a value of unity at points covered by said movable blocks and zero elsewhere.

14. The method of claim 1, wherein said determining said total weighted wire length as said function of coordinates of centers of said movable blocks by summing said half perimeter wire length over said plurality of subsets for said current placement comprises using a piecewise quadratic smooth approximation to maximum and minimum.

15. A non-transitory computer readable medium comprising computer executable instructions which when executed by a computer cause the computer to perform a method of:
representing a putative circuit design as a set of movable blocks of predetermined size which must fit into a bounding box, said set of movable blocks comprising a plurality of subsets to be interconnected by wires, said set of movable blocks having an initial placement;
initializing a density penalty weight;
setting a current placement equal to said initial placement;
determining a total weighted wire length as a function of coordinates of centers of said movable blocks by summing a half perimeter wire length over said plurality of subsets for said current placement;
determining a density penalty as a convolution of an indicator function of said current placement and a convolution kernel, via incremental integer computation without use of floating point arithmetic, to improve a speed at which said computer operates;
moving said movable blocks to minimize a penalty function comprising a sum of:
said total weighted wire length as said function of said coordinates of said centers of said movable blocks, and
a product of said density penalty weight and said density penalty,
to obtain a revised placement;
setting said current placement equal to said revised placement;
increasing said density penalty weight; and
repeating said steps of determining said density penalty, moving said movable blocks, setting said current placement equal to said revised placement, and increasing said density penalty weight, until a maximum value of said density penalty weight is reached or said density penalty approaches zero, to obtain a further revised placement.

16. The non-transitory computer readable medium of claim 15, wherein:
increasing said density penalty weight comprises increasing said density penalty weight exponentially;
said bounding box is divided into a plurality of bins; and
moving said movable blocks to minimize said penalty function comprises moving one of said movable objects at a time from a current one of said bins to a neighboring one of said bins in a direction of descent of said penalty function.

17. A computer comprising:
a memory; and
at least one processor, coupled to said memory, and operative to:
represent a putative circuit design as a set of movable blocks of predetermined size which must fit into a bounding box, said set of movable blocks comprising a plurality of subsets to be interconnected by wires, said set of movable blocks having an initial placement;
initialize a density penalty weight;
set a current placement equal to said initial placement;
determine a total weighted wire length as a function of coordinates of centers of said movable blocks by summing a half perimeter wire length over said plurality of subsets for said current placement;
determine a density penalty as a convolution of an indicator function of said current placement and a convolution kernel, via incremental integer computation without use of floating point arithmetic, to improve a speed at which said computer operates;
move said movable blocks to minimize a penalty function comprising a sum of:
said total weighted wire length as said function of said coordinates of said centers of said movable blocks, and
a product of said density penalty weight and said density penalty,
to obtain a revised placement;
set said current placement equal to said revised placement;
increase said density penalty weight; and
repeat said steps of determining said density penalty, moving said movable blocks, setting said current placement equal to said revised placement, and increasing said density penalty weight, until a maximum value of said density penalty weight is reached or said density penalty approaches zero, to obtain a further revised placement.

18. The computer of claim 17, wherein said at least one processor is further operative to:
provide a design structure, based on said further revised placement, to fabrication equipment to facilitate fabrication of a physical integrated circuit in accordance with said design structure.

19. The computer of claim 17, wherein:
said at least one processor increases said density penalty weight exponentially;
said bounding box is divided into a plurality of bins; and
said at least one processor is operative to move said movable blocks to minimize said penalty function by moving one of said movable objects at a time from a current one of said bins to a neighboring one of said bins in a direction of descent of said penalty function.

20. The computer of claim 17, wherein said at least one processor is further operative to:
- render said putative circuit design in a design language;
- carry out logic synthesis on said putative circuit design rendered in said design language to determine a number of blocks in said set of movable blocks, said predetermined size of said blocks, and a size of said bounding box;
- carry out clock and timing optimizations on said further revised placement;
- carry out routing based on said clock and timing optimizations;
- carry out post-route optimization subsequent to said routing;
- prepare a layout based on said post-route optimization;
- instantiate said layout as a design structure; and
- provide said design structure to fabrication equipment to facilitate fabrication of a physical integrated circuit in accordance with said design structure.

* * * * *